United States Patent
Zhang

(10) Patent No.: US 9,678,241 B2
(45) Date of Patent: Jun. 13, 2017

(54) MAGNETIC RANGING TOOL AND METHOD

(75) Inventor: Jun Zhang, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1413 days.

(21) Appl. No.: 13/339,856

(22) Filed: Dec. 29, 2011

(65) Prior Publication Data
US 2013/0173164 A1    Jul. 4, 2013

(51) Int. Cl.
*G01V 3/08* (2006.01)
*E21B 47/022* (2012.01)
*G01V 3/28* (2006.01)

(52) U.S. Cl.
CPC .......... *G01V 3/28* (2013.01); *E21B 47/02216* (2013.01); *G01V 3/08* (2013.01)

(58) Field of Classification Search
CPC ............................ G01V 3/08; E21B 47/02216
USPC .............................................................. 702/6
See application file for complete search history.

(56) References Cited

U.S. PATENT DOCUMENTS

| 4,443,762 | A | | 4/1984 | Kuckes | |
|---|---|---|---|---|---|
| 5,485,089 | A | * | 1/1996 | Kuckes | .......................... 324/346 |
| 5,512,830 | A | * | 4/1996 | Kuckes | ................... E21B 47/00 324/346 |
| 5,589,775 | A | | 12/1996 | Kuckes | |
| 5,623,407 | A | | 4/1997 | Brooks | |
| 5,923,170 | A | | 7/1999 | Kuckes | |
| 6,321,456 | B1 | | 11/2001 | McElhinney | |
| 6,991,045 | B2 | | 1/2006 | Vinegar et al. | |
| 7,260,479 | B2 | * | 8/2007 | McElhinney | ..................... 702/9 |
| 7,538,650 | B2 | | 5/2009 | Stenerson et al. | |
| 7,617,049 | B2 | | 11/2009 | McElhinney et al. | |
| 7,656,161 | B2 | | 2/2010 | McElhinney | |
| 7,703,548 | B2 | | 4/2010 | Clark | |
| 7,712,519 | B2 | | 5/2010 | McElhinney et al. | |
| 7,812,610 | B2 | | 10/2010 | Clark et al. | |
| 8,010,290 | B2 | | 8/2011 | Illfelder | |
| 8,463,549 | B1 | * | 6/2013 | Selman | ..................... E21B 7/04 702/11 |
| 8,810,247 | B2 | * | 8/2014 | Kuckes | ............. E21B 47/02216 324/346 |
| 2007/0278008 | A1 | * | 12/2007 | Kuckes et al. | .................. 175/40 |
| 2008/0177475 | A1 | | 7/2008 | McElhinney et al. | |

(Continued)

OTHER PUBLICATIONS

Grills, Tracy L., "Magnetic Ranging Technologies for Drilling Steam Assisted Gravity Drainage Well Pairs and Unique Well Geometries—A Comparison of Technologies", SPE 79005—SPE International Thermal Operations and Heavy Oil Symposium and International Horizontal Well Technology Conference, 2002, 8 pages.

(Continued)

*Primary Examiner* — Bryan Bui

(57) ABSTRACT

A downhole magnetic ranging tool includes first and second axially spaced magnetic sources deployed in a downhole tool body. The first and second magnetic sources have magnetic moments that axially opposed one another. A magnetic field sensor is deployed axially between the first and second magnetic sources. The tool may be utilized, for example, in subterranean well twinning, well intercept, and well avoidance operations to obtain a separation distance and dip angle between a drilling well and a target well.

24 Claims, 7 Drawing Sheets

(56) References Cited

U.S. PATENT DOCUMENTS

| | | |
|---|---|---|
| 2008/0275648 A1 | 11/2008 | Illfelder |
| 2009/0260878 A1 | 10/2009 | Morley et al. |
| 2009/0260879 A1 | 10/2009 | Clark et al. |
| 2009/0308657 A1 | 12/2009 | Clark et al. |
| 2011/0079431 A1 | 4/2011 | Clark |
| 2012/0139543 A1* | 6/2012 | McElhinney et al. ........ 324/346 |

OTHER PUBLICATIONS

Kuckes, et al., "New Electromagnetic Surveying/Ranging Method for Drilling Parallel Horizontal Twin Wells", SPE 27466—SPE Drilling & Completion, vol. 11 (2), Jun. 1996, pp. 85-90.

* cited by examiner

MAGNETIC RANGING TOOL AND METHOD

CROSS REFERENCE TO RELATED APPLICATIONS

None.

FIELD OF THE INVENTION

Disclosed embodiments relate generally to subterranean well drilling operations and more particularly to an apparatus and method for making magnetic ranging measurements while drilling.

BACKGROUND INFORMATION

Heavy oil is commonly produced by first heating the heavy oil to reduce its viscosity. For example, steam assisted gravity drainage "SAGD" operations are commonly employed to produce heavy oil in tar sands formations. In such SAGD applications, twin horizontal wells having a vertical separation distance typically in the range from about 4 to about 20 meters are drilled. Steam is injected into the upper well to heat the tar sand. The heated heavy oil contained in the tar sand and condensed steam may then be produced from the lower well. The success of such heavy oil recovery techniques is often dependent upon producing precisely positioned twin wells having a predetermined relative spacing in the horizontal injection/production zone (which often extends up to and beyond 1500 meters in length). Positioning the wells either too close or too far apart may severely limit production, or even result in no production.

Active magnetic ranging techniques are commonly utilized SAGD applications. In one known active ranging methodology (e.g., as disclosed in U.S. Pat. No. 5,485,089), a high strength electromagnet is pulled down through a cased target well during drilling of a twin well. An MWD tool deployed in the drill string measures the magnetic field during drilling of the twin well. In another known active ranging method (e.g., as disclosed in U.S. Pat. No. 5,589,775), a magnet is mounted on a rotating sub below a drilling motor (deployed in the twin well). A wireline surveying tool is pulled down through the cased target well and measures the magnitude and direction of the magnetic field during drilling of the twin well. Both methods utilize the magnetic field measurements to compute a range and a bearing (a distance and a direction) from the twin well to the target well and to guide continued drilling of the twin.

The above described active ranging methods, while utilized commercially, are known to include several significant drawbacks. For example, these methods require simultaneous and continuous access to both the twin and target wells. Such continuous, simultaneous access to both wells tends to be labor and equipment intensive (and therefore expensive) and can also present safety concerns. These methods also require precise axial alignment between the magnetic source deployed in one well and the magnetic sensors deployed in the other. Misalignment can result in a misplaced twin well, which can have a significant negative impact on future well productivity. Moreover, the steps taken to assure proper alignment (such as making magnetic field measurements at multiple longitudinal positions in one of the wells) are time consuming (and therefore expensive) and may further be problematic in deep wells. Other drawbacks are described in more detail in U.S. Pat. No. 7,656,161, which is incorporated by reference in its entirety herein.

U.S. Pat. No. 7,812,610 and U.S. Patent Publications 2009/0260879 and 2011/0079431 disclose active magnetic ranging methodologies using an insulative gap and an electric dipole source. The electric dipole generates a magnetic field that may be utilized in the magnetic ranging measurements. Such methods may not always require simultaneous access to both wells. However, they generally require a detailed knowledge of the formation resistivity and structure in order to determine an accurate distance between the two wells.

Another magnetic ranging methodology (referred to herein as enhanced passive ranging) involves imparting a permanent magnetization to the casing string in the target well. The permanent magnetization may be imparted before or after deployment of the casing string in the target well, for example as disclosed in U.S. Pat. Nos. 7,538,650, 7,656,161 and 7,712,519 and U.S. patent application Ser. No. 12/962,058, each of which is incorporated by reference in its entirety herein. An MWD tool deployed in the drill string measures the magnetic field during drilling of the twin well. U.S. Pat. Nos. 7,617,049 and 8,010,290, each of which is incorporated by reference in its entirety herein, disclose various methods for computing a distance and a direction between the twin and target wells.

Enhanced passive ranging techniques have been utilized commercially and advantageously overcome many of the draw backs associated with the active ranging methodologies described above. However, there remains room for improvement and for the development of other magnetic ranging methodologies. For example, magnetizing large numbers of casing tubulars, storing the magnetized tubulars, and deploying the magnetized tubulars in the target well can introduce technical and logistical challenges. In-situ magnetization of the target well casing string can also be challenging and requires temporary access to the target well.

SUMMARY

Downhole magnetic ranging tool embodiments are disclosed. In one aspect a downhole magnetic ranging tool includes first and second magnetic sources deployed in a downhole tool body. The first and second magnetic sources have magnetic moments that axially opposed one another. A magnetic field sensor is deployed axially between the first and second magnetic sources. The tool may be utilized, for example, in subterranean well twinning, well intercept, and well avoidance operations to obtain a separation distance and dip angle between a drilling well and a target well.

The disclosed embodiments may provide various technical advantages. For example, since both the magnetic source and the magnetic field sensor are deployed in the magnetic ranging tool, ranging operations can be conducted without any access to the target well. Moreover, there is no requirement to permanently magnetize the target well prior to the ranging operation.

The disclosed embodiments may be further advantageous in that they enable both a separation distance and a dip angle between the drilling well and the target well to be computed. Obtaining the dip angle may be particularly advantageous in certain operations in that it is a predictive measure of a future separation distance. For example, in a twin well drilling operation, a nonzero dip angle indicates that the separation distance will either increase or decrease if the drilling direction remains unchanged. This may enable an operator to respond proactively rather than reactively in following the target well.

The disclosed embodiments may be still further advantageous in that they do not require any particular knowledge of the subterranean formation properties such as the formation resistivity or the physical structure of the formation. The separation distance and dip angle between the drilling well and the target well are substantially independent of such formation properties.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
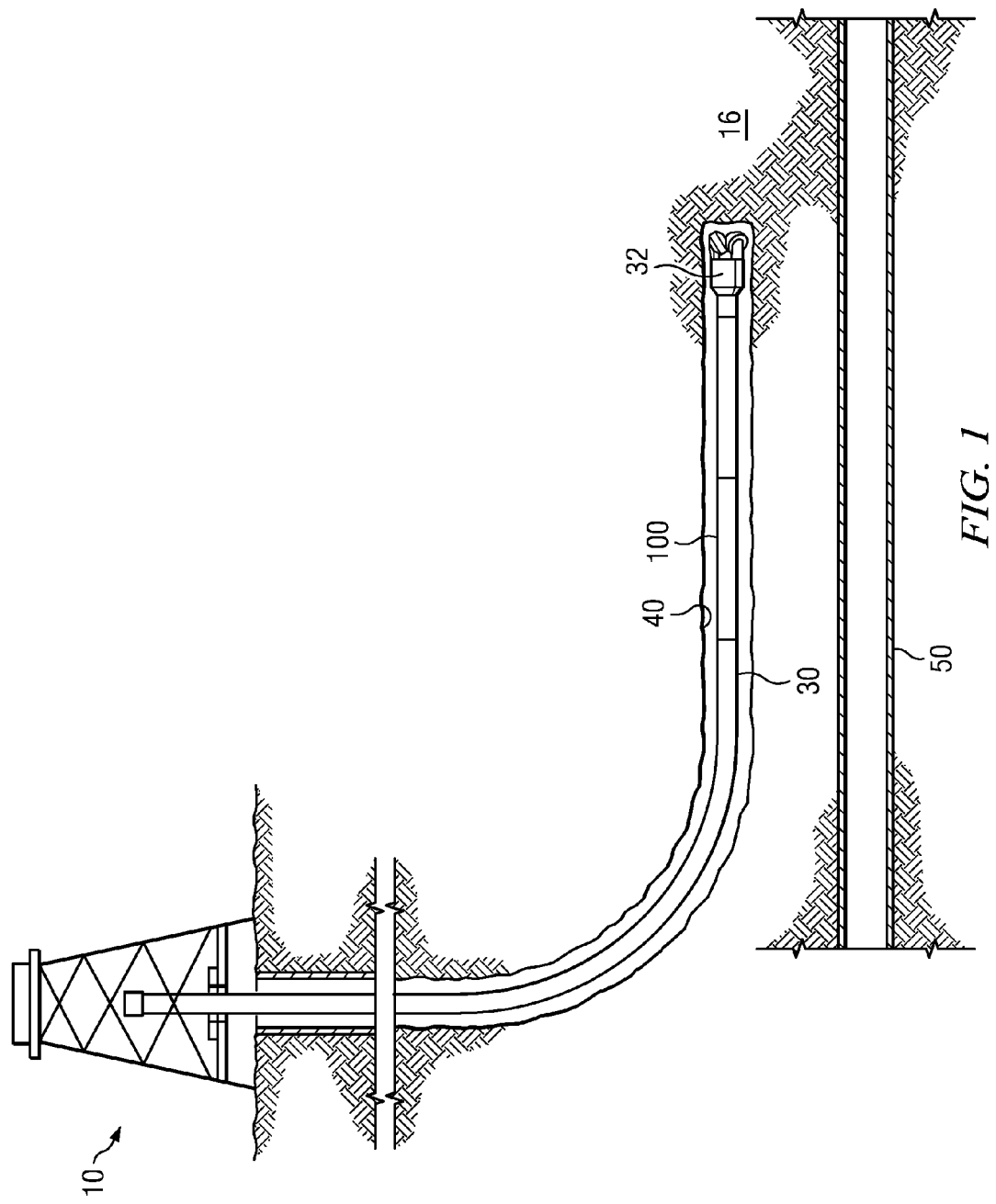
FIG. 1 depicts one example of a SAGD twin well drilling operation on which a disclosed magnetic ranging tool may be utilized.

FIG. 1 depicts one example of a SAGD well twinning operation. A rig 10 is positioned over a subterranean oil or gas formation (e.g., a tar sands formation 16). The rig may include, for example, a derrick and a hoisting apparatus for lowering and raising a drill string 30 into an out of wellbore 40 (also referred to as the twin well and the drilling well). In the depicted embodiment drill string 30 includes a drill bit 32 and a magnetic ranging tool 100 deployed uphole of the drill bit 32. During a well twinning operation (e.g., as depicted) the magnetic ranging tool makes magnetic measurements while drilling which are used to compute the distance between the twin well 40 and the target well 50. The magnetic measurements may also be used to guide subsequent drilling of the twin well 40 with respect to the target well 50. The drill string 30 may further include a downhole drilling motor, a steering tool such as a rotary steerable tool or a bent sub, a downhole telemetry system, and one or more MWD or LWD tools including various sensors for sensing downhole characteristics of the borehole and the surrounding formation. The disclosed embodiments are not limited in these regards.

It will be understood by those of ordinary skill in the art that the deployment illustrated on FIG. 1 is merely an example. For example, disclosed embodiments are not limited to well twinning operations in which the twin well is drilled above the target well. A twin well may be drilled at substantially any orientation with respect to the target well (e.g., the twin may be drilled below or side by side with the target). Moreover, the disclosed embodiments are not even limited to well twinning operations, but may also be utilized in substantially any well intercept or well avoidance application in which it is desirable to know the relative position between a drilling well and a magnetically permeable target.

Figure 2:
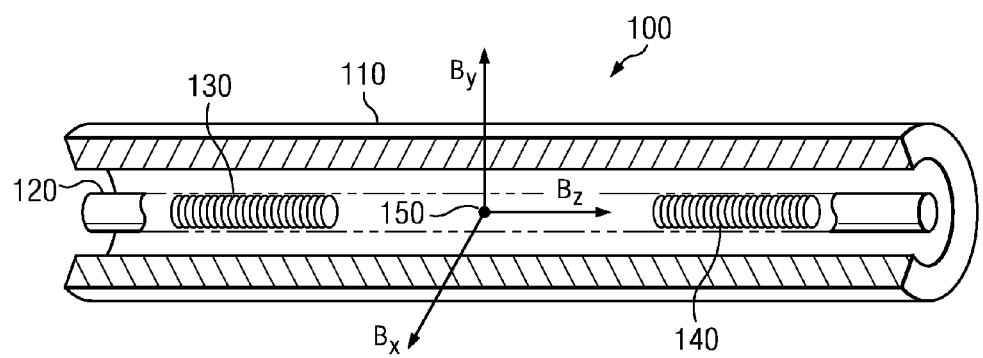
FIG. 2 depicts the magnetic ranging tool shown on FIG. 1.

FIG. 2 depicts one example of magnetic ranging tool 100. In the depicted embodiment, magnetic ranging tool 100 includes a substantially tubular tool body 110 configured for coupling with a conventional drill string (e.g., drill string 30 in FIG. 1). A central housing 120 is deployed co-axially in the tool body 110. The tool body and the central housing may be fabricated from a nonmagnetic material (e.g., a nonmagnetic steel commonly utilized in nonmagnetic drill collars and MWD tools) so as to minimize deflection of the magnetic field. However, such deflection can be accounted for via known techniques.

First and second substantially identical magnetic sources 130 and 140 are deployed in the central housing 120. The magnetic sources 130 and 140 are configured and deployed such that their magnetic moments oppose one another, thereby forming a north-north opposing pole or a south-south opposing pole. The magnetic sources may include substantially any magnetic source, for example, including permanent magnets, electromagnets, or an antenna configured to generate a magnetic field such as a solenoid.

In embodiments in which permanent magnets are utilized, it is generally desirable that the magnets provide a strong magnetic force and be configured to withstand the high temperatures encountered in downhole drilling operations. Rare earth magnets such as Neodymium magnets and Samarium Cobalt magnets tend to provide a very strong magnetic force and may be utilized. Isotropic and Anisotropic Ferrite, Alnico alloys, and Samarium Cobalt alloys are typically suitable at high temperatures (e.g., at temperatures exceeding 250 degrees C.) and therefore may also be utilized.

In certain operations there may be advantages to using permanent magnets. For example, rare earth magnets can provide a strong magnetic flux that can generate a reliable signal even with increasing distance between the twin and target wells. Moreover, permanent magnets do not require an external power source and therefore tend to reduce costs and can be readily used in operations in which electrical power is limited.

In embodiments that make use of an electromagnet or a solenoid it may be advantageous to generate a low frequency alternating "AC" magnetic field. For example, the frequency may be in the range from about 0 to about 100 Hz, from about 1 to about 10 Hz, or from about 3 to about 5 Hz. The use of an AC magnetic field may advantageously improve a signal to noise ratio as the static magnetic field of the earth may be removed as a DC bias or via filtering. Moreover, the use of an electromagnet or a solenoid enables the magnetic field to be selectively turned on and off so as conserve electrical power and to minimize magnetic interference elsewhere in the drill string (e.g., at an MWD tool). Those of ordinary skill in the art will readily appreciate that electromagnet and/or solenoid sources may be readily powered via substantially any downhole power source (e.g., including batteries, downhole alternators, and downhole turbine generators).

Magnetic ranging tool 100 further includes a magnetic sensor 150 deployed between the magnetic sources 130 and 140 in the central housing 120. Suitable magnetic field sensors may include conventional ring core flux gate magnetometers or conventional magnetoresistive sensors, for example, Part Number HMC-1021D, available from Honeywell. In the depicted embodiment, the magnetic sensor 150 includes a tri-axial magnetometer arrangement including three mutually perpendicular magnetic field sensors, being designated as $B_x$, $B_y$, and $B_z$ in FIG. 2. By convention, a right handed system is designated in which the z-axis magnetometer $B_z$ is oriented substantially parallel with the borehole as indicated (although disclosed embodiments are not limited by such conventions). It will be understood that the disclosed embodiments are not limited to the use of a tri-axial magnetometer set as the use of a single cross-axial magnetometer can be sufficient to obtain a separation distance between the drilling well and a target well.

In the depicted embodiment, magnetic sensor 150 is deployed at an axial midpoint between the first and second magnetic sources 130 and 140 (at a distance 'l' from each of the magnetic sources). In the absence of a nearby magnetically permeable structure (e.g., a cased borehole), the magnetic field about the sources 130 and 140 is substantially symmetric. Thus the measured magnetic field at the midpoint between the sources 130 and 140 is near zero (since the midpoint is a magnetic balance point between the magnetically opposed sources). In the presence of a magnetically permeable structure (e.g., a cased borehole having a relative magnetic permeability of 100 or greater), the magnetic field about the magnetic sources 130 and 140 is deflected and becomes asymmetric. The asymmetry moves the magnetic balance point away from the midpoint such that a non-zero magnetic field may be measured by the magnetic sensor 150. As described in more detail below, the measured magnetic field can be related to a separation distance between the magnetic sensor 150 and a magnetically permeable target (e.g., a target well).

It will be understood that the disclosed embodiments are not limited to embodiments including a single magnetic field sensor deployed between the magnetic field sources 130 and 140. Multiple sensors may be utilized so as to provide additional data. Such additional data may be useful, for example, in determining the separation distance between the wells. For example, disclosed embodiments may include a plurality of axially spaced and/or radially spaced magnetic field sensors deployed between the magnetic sources 130 and 140.

Figure 3:
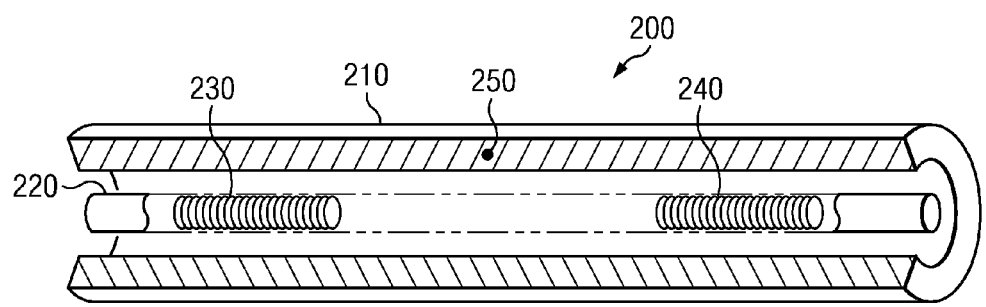
FIG. 3 depicts an alternative magnetic ranging tool embodiment.
Figure 4:
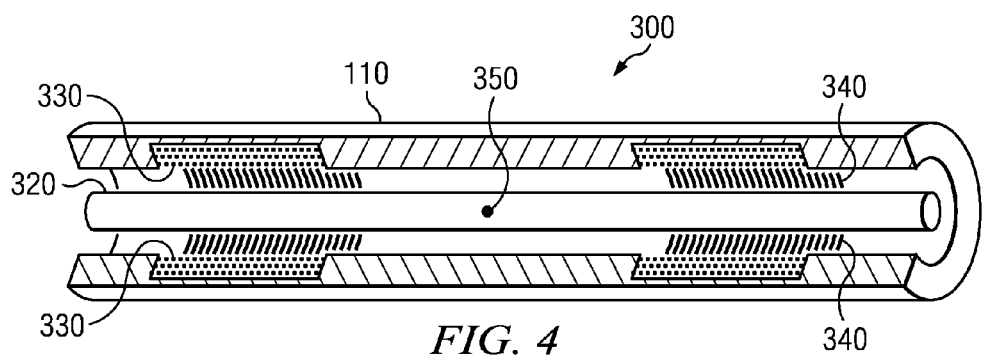
FIG. 4 depicts another alternative magnetic ranging tool embodiment.
Figure 5:
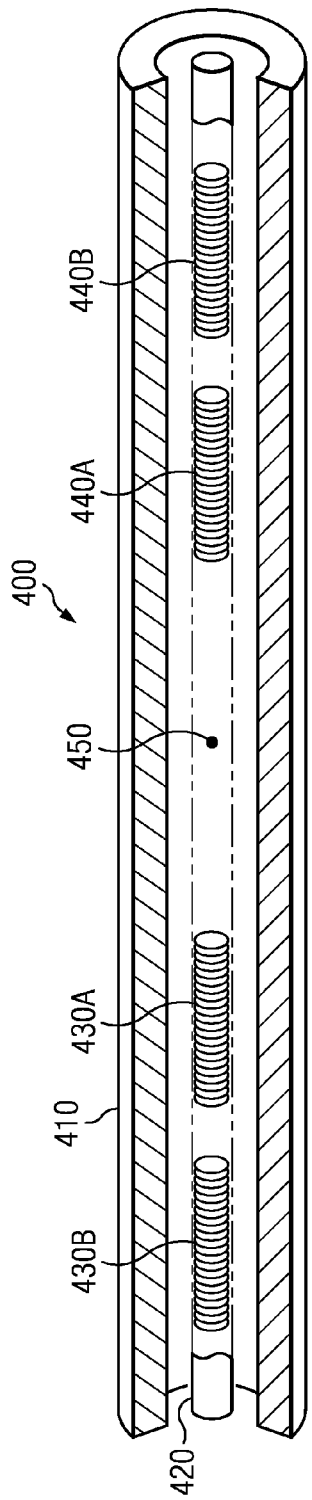
FIG. 5 depicts still another alternative magnetic ranging tool embodiment.

FIGS. 3-5 depict alternative magnetic ranging tool embodiments 200, 300, and 400. In FIG. 3, magnetic ranging tool 200 is similar to magnetic ranging tool 100 in that it includes a central housing 220 deployed coaxially in a tool body 210. The first and second magnetic sources 230 and 240 are deployed in the central housing 220 as described above with respect to FIG. 2. Magnetic ranging tool 200 differs from magnetic ranging tool 100 in that the magnetic field sensor 250 is deployed off-axis in the tool body 210 as depicted.

In FIG. 4 magnetic ranging tool 300 is also similar to magnetic ranging tool 100 in that it includes a central housing 320 deployed coaxially in a tool body 310. Magnetic ranging tool 300 differs from magnetic ranging tools 100 and 200 in that the magnetic sources 330 and 340 are deployed off-axis in the tool body 310. Magnetic sources 330 and 340 may include magnetic rings or multiple magnetic elements deployed about the circumference of the tool body 310. As described above with respect to FIG. 2, the magnetic sources 330 and 340 are configured and deployed such that their magnetic moments oppose one another, thereby forming a north-north opposing pole or a south-south opposing pole. In FIG. 4 magnetic sensor 350 is deployed in the central housing 320 at the axial midpoint between the magnetic sources 330 and 340. The magnetic sensor 350 may also be deployed in the tool body 310 as depicted on FIG. 3.

In FIG. 5 magnetic ranging tool 400 is similar to magnetic ranging tool 100 but includes a first pair of inner magnetic sources 430A and 440A and a second pair of outer magnetic sources 430B and 440B deployed in central housing 420. The disclosed embodiments are not limited to first and second pairs, but may include substantially any number of pairs of magnetic sources. The magnetic sources are again configured and deployed such that their magnetic moments oppose one another, thereby forming north-north or south-south opposing poles. The use of multiple pairs of magnetic sources tends to advantageously enable magnetic ranging to be performed at multiple depths of investigation. For example, in the embodiment depicted on FIG. 5, the pair of outer magnetic sources 430B and 440B may be utilized when ranging to a more distant target and the pair of inner magnetic sources 430A and 440A may be utilized when ranging to a closer target. Moreover, the multiple pairs of magnetic sources may be utilized simultaneously to generate alternative magnetic field patterns. While not shown, when the magnetic sources include solenoids or electromagnets, ranging tool 400 may further include circuitry configured to selectively fire the pairs of magnetic sources.

Figure 6:
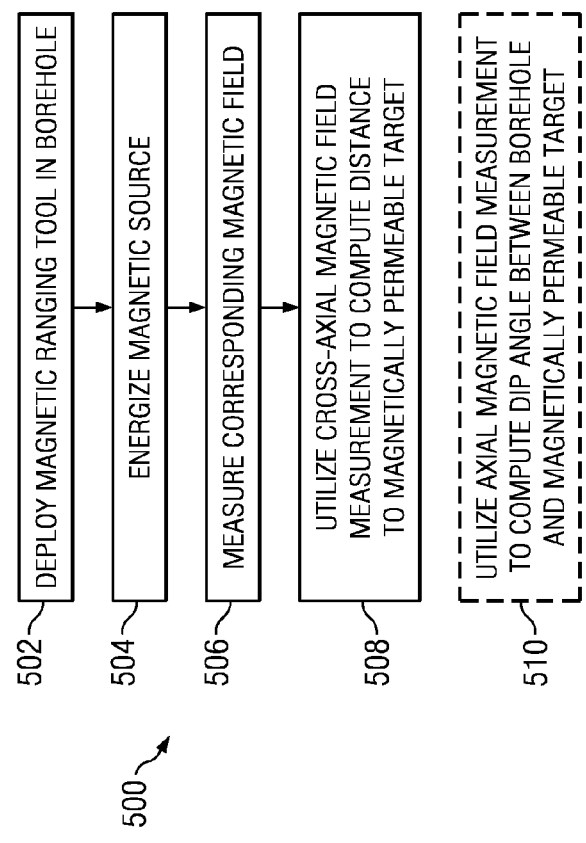
FIG. 6 depicts a flow chart of a disclosed method embodiment.

FIG. 6 depicts a flow chart of one disclosed method embodiment 500. Method 500 includes deploying a magnetic ranging tool (e.g., one of magnetic ranging tools 100, 200, 300, or 400) in a subterranean borehole at 502. In embodiments employing solenoids or electromagnets, the magnetic sources may be energized at 504. The corresponding magnetic field may then be measured at 506 and utilized to compute a distance to a magnetically permeable target at 508. The magnetic field measurements may optionally further be utilized to compute a dip angle between the subterranean borehole and the magnetically permeable target at 510.

Thus in one aspect, a method for obtaining a separation distance between a first wellbore and a second cased wellbore may include deploying a magnetic ranging tool in a subterranean borehole. The magnetic ranging tool may include a magnetic field sensor deployed axially between first and second axially spaced magnetic sources having magnetic moments that axially opposed one another. The method may further include energizing the magnetic sources, measuring a magnetic field with the magnetic field sensor, and processing the measured magnetic field to compute the separation distance.

The disclosed embodiments are now described in further detail by way of the following theoretical examples. These examples are intended only to be examples and should not be construed as in any way limiting the scope of the claims.

Figure 7:
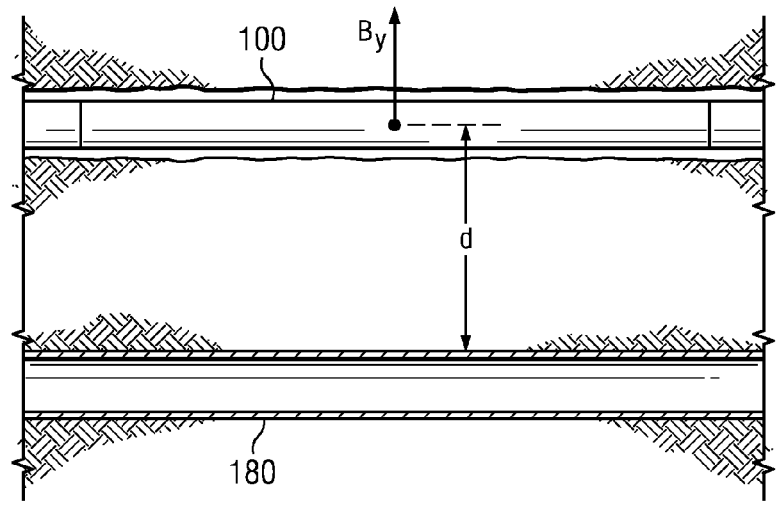
FIG. 7 depicts an example of a drilling operation in which the magnetic ranging tool shown on FIG. 2 is deployed substantially parallel with a cased wellbore.

FIG. 7 depicts an example of a hypothetical drilling operation in which the magnetic ranging tool 100 shown on FIG. 2 is deployed substantially parallel with a cased wellbore 180 at a distance d from the cased wellbore 180. In this example, the cased wellbore 180 was assumed to have an outer diameter of eight inches, an inner diameter of six inches, an electrical conductivity of $1.82 \times 10^6$ s/m, and a relative magnetic permeability of 100. The first and second magnetic sources 130 and 140 each included a 6000 turn solenoid having a length of 12 inches, an outer diameter of 2 inches, and an inner diameter of 1.4 inches. The magnetic field was generated using an alternating current having a frequency of 3 Hz.

Figure 8:
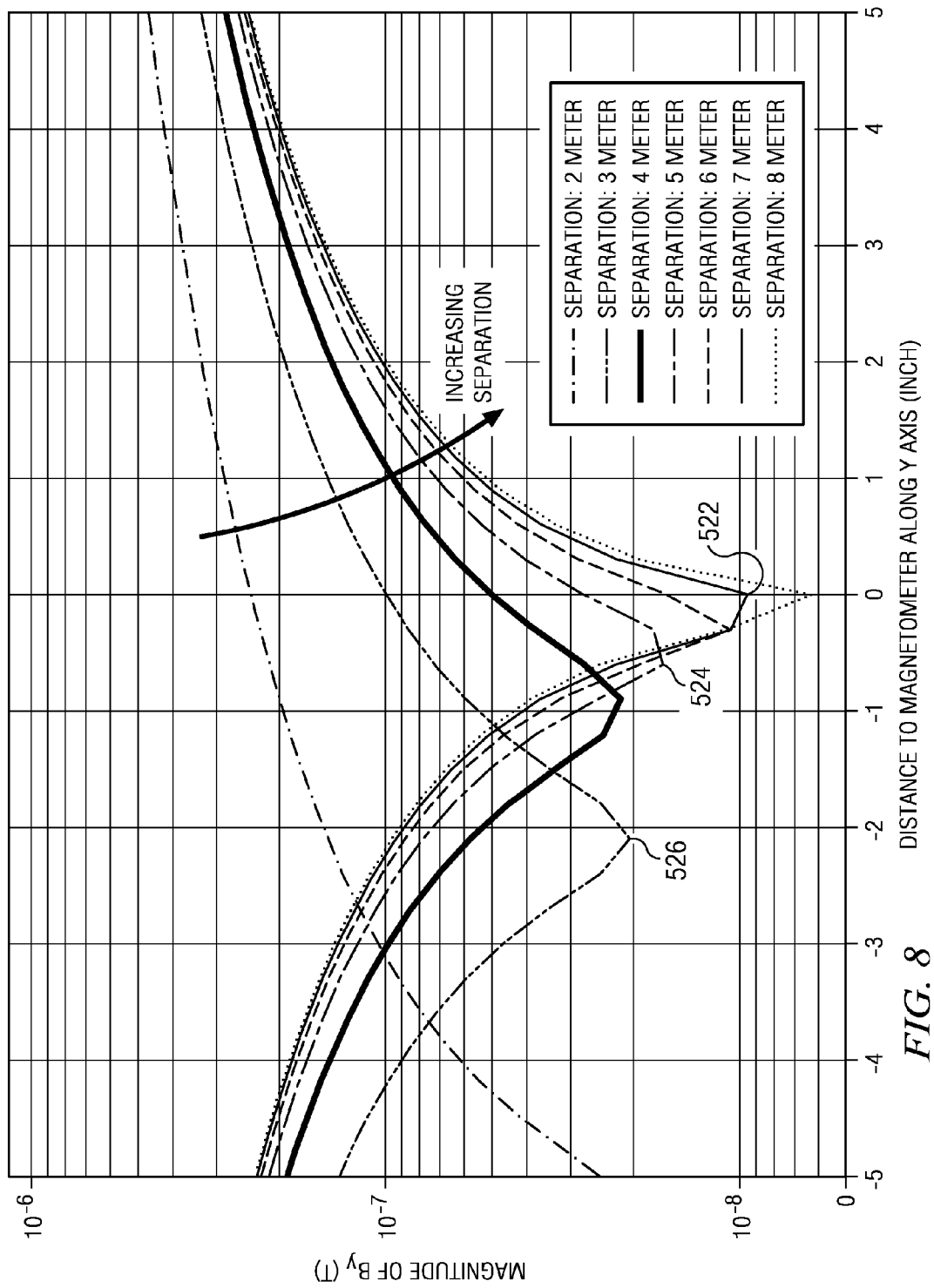
FIG. 8 depicts a plot of a theoretical cross-axial magnetic field component when the magnetic ranging tool is deployed at various distances from the cased wellbore in FIG. 7.

FIG. 8 depicts a series of plots of the computed cross-axial magnetic field component $B_y$ for the ranging operation depicted on FIG. 7 as a function of a cross-axial magnetometer spacing. The plots were generated using a commercially available finite element analysis software package. In the depicted embodiment, the cross axial magnetometer spacing represents the distance from the magnetic sensor towards or away from the target well 180 and indicates the location of the magnetic balance point. Each plot represents the cross axial magnetic field at a particular separation distance d between the magnetic ranging tool 100 and the target casing 180 (plots ranging from a separation distance of 2 meters to a separation distance of 8 meters are depicted).

Each of the plots depicted on FIG. 8 includes a minimum representing the magnetic balance point. Note that the magnetic balance point is deflected towards the target well casing 180 as the separation distance d between the magnetic ranging tool and the target well casing decreases. For example, the magnetic balance point was located at approximately the same location as the magnetic field sensor at a separation distance of 8 meters as indicated at 522. At a separation distance of 5 meters, the magnetic balance point was deflected about one half of one inch towards the target well casing as indicated at 524. At a separation distance of 3 meters, the magnetic balance point was deflected about 2 inches towards the target well casing as indicated at 526. This deflection of the magnetic balance point results in a corresponding increase in the cross-axial magnetic field strength at the magnetic sensor 150 (FIG. 2). It will be understood that the values of the minima (e.g., as depicted at 522, 524, and 526) should be near zero. The non-zero depicted values are the result of the selected finite element grid size.

Figure 9:
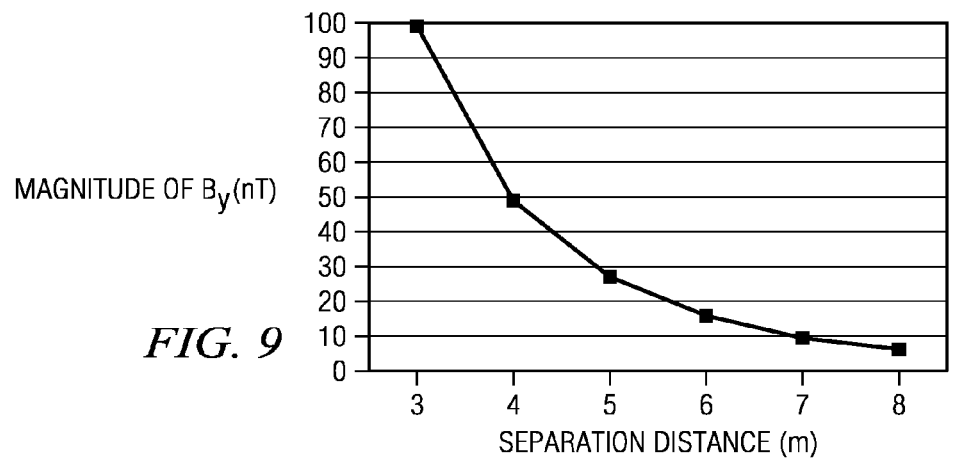
FIG. 9 depicts a plot of the cross axial magnetic field component versus separation distance for the example given in FIGS. 7 and 8.

FIG. 9 depicts a plot of the cross axial magnetic field (in units of nano-Tesla) at the magnetic sensor as a function of the separation distance d between the magnetic ranging tool and the target well casing. In the depicted example, the magnitude of the cross axial magnetic field decreases with increasing separation distance. In other words, the cross axial magnetic field increases as the twin well approaches the target well casing.

Figure 10:
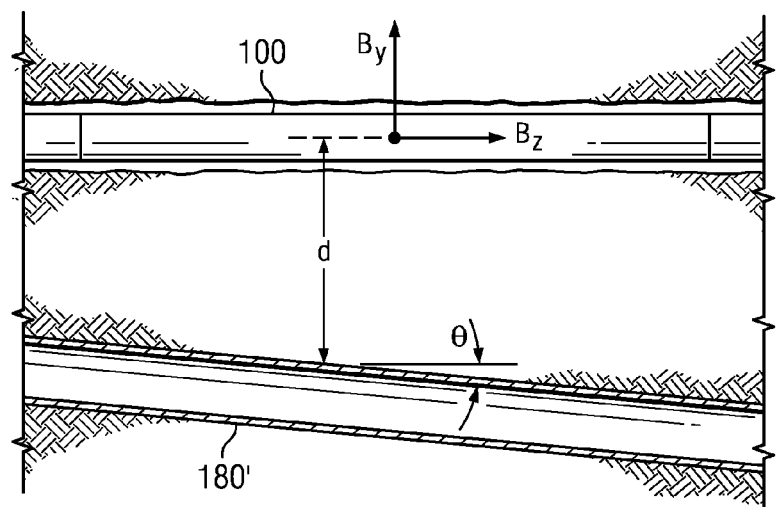
FIG. 10 depicts an example of a drilling operation in which the magnetic ranging tool shown on FIG. 2 is inclined with respect to a cased wellbore.

FIG. 10 depicts an example of another hypothetical drilling operation in which the magnetic ranging tool 100 shown on FIG. 2 is inclined with respect to a cased wellbore 180'. The example of FIG. 10 is similar to that depicted on FIG. 7 in that the magnetic ranging tool was deployed a distance d from the cased wellbore. The target well casing configuration and the magnetic ranging tool configuration was identical to that described above with respect to FIG. 7. In the depicted example, the dip angle θ was equal to 5.7 degrees (i.e., tan θ=0.1).

Figure 11:
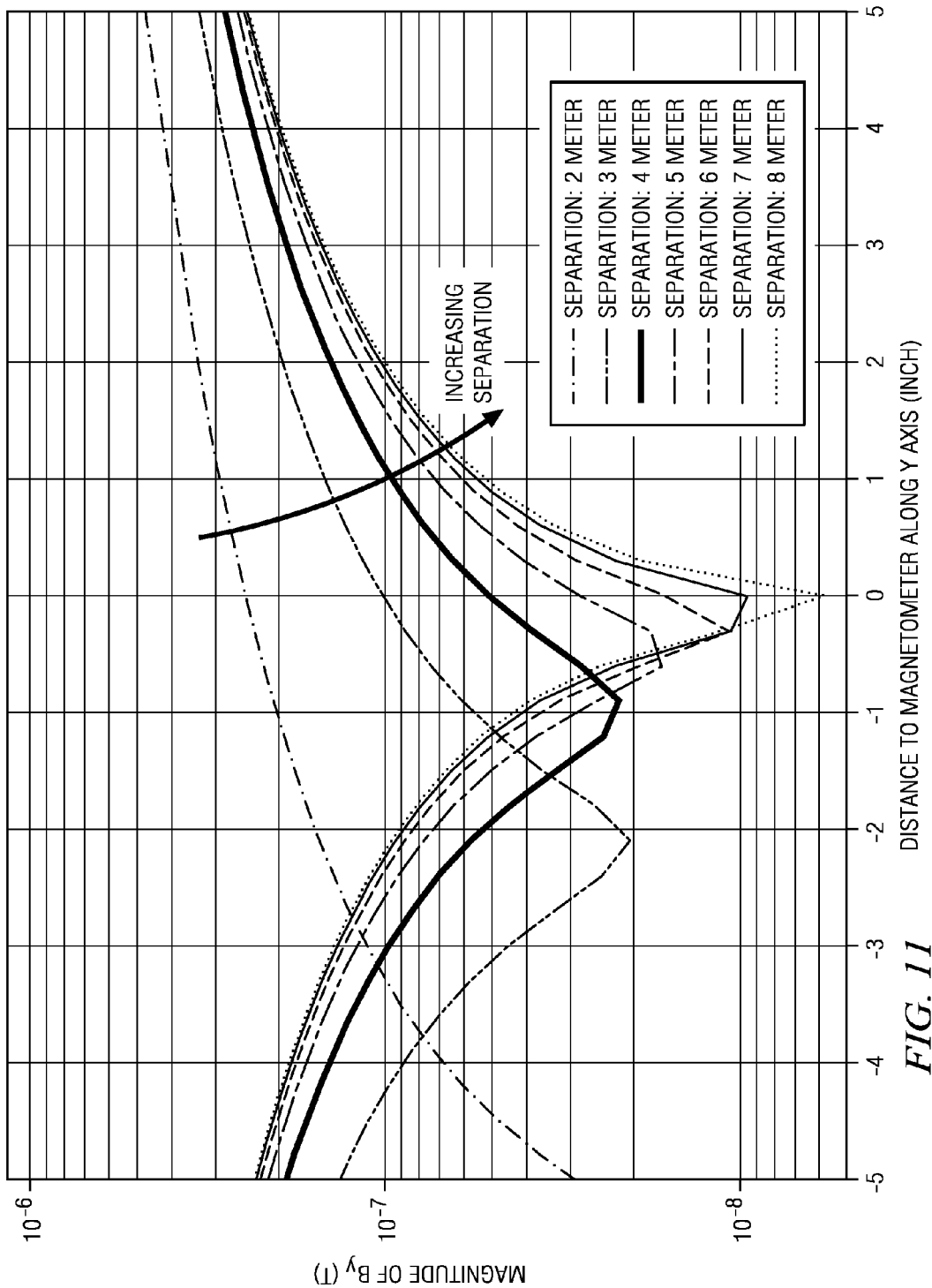
FIG. 11 depicts a plot of a theoretical cross-axial magnetic field component when the magnetic ranging tool is deployed at various distances from the cased wellbore in FIG. 9.

FIG. 11 depicts a series of plots of the computed cross-axial magnetic field component $B_y$ for the ranging operation depicted on FIG. 10 as a function of a cross-axial magnetometer spacing. The plots were generated using a commercially available finite element analysis software package. The depicted plots are highly similar to those shown on FIG. 8 indicating that the relationship between the cross-axial magnetic field component and the separation distance d between the magnetic ranging tool and the target well casing is substantially independent of the dip angle between the wells.

Figure 12:
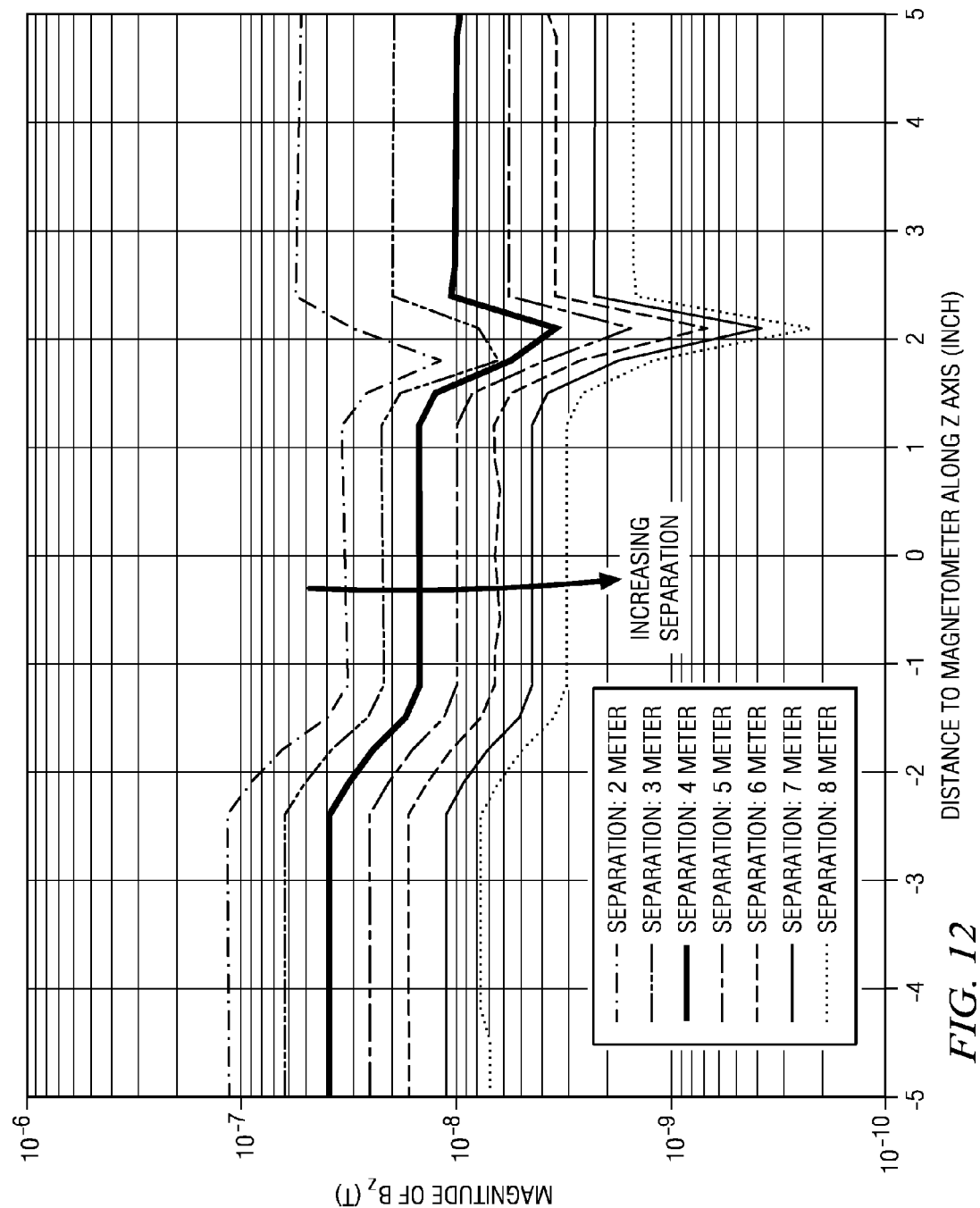
FIG. 12 depicts a plot of a theoretical axial magnetic field component when the magnetic ranging tool is deployed at various distances from the cased wellbore in FIG. 9.

FIG. 12 depicts a series of plots of the computed axial magnetic field component $B_z$ for the ranging operation depicted on FIG. 10 as a function of an axial magnetometer spacing. In the depicted embodiment, the axial magnetometer spacing represents the distance from away from the magnetic sensor along the axis of the magnetic ranging tool 100 and indicates the location of the axial magnetic balance point. Each plot represents the axial magnetic field at a particular separation distance d between the magnetic ranging tool 100 and the target casing 180 (plots ranging from a separation distance of 2 meters to a separation distance of 8 meters are depicted).

Each of the plots depicted on FIG. 12 includes a minimum representing the magnetic balance point of the axial magnetic field component. In each plot the magnetic balance point is deflected in the uphole direction by distance of about 2 inches due to the dip angle between the two wells. Moreover, the magnitude of $B_z$ increases with decreasing separation distance between the two wells indicating that $B_z$ depends on both the separation distance and the dip angle between the two wells.

The cross axial and axial magnetic field measurements may be utilized in a well twinning operation (or in any other well intercept or well avoidance application) to compute the separation distance (and optionally a dip angle) between the first and second wellbores. This may be expressed mathematically, for example, as follows:

$$B_y = f_1(d, \theta) \approx f_1'(d) \qquad \text{Equation 1}$$

$$B_z = f_2(d, \theta) \qquad \text{Equation 2}$$

where $B_y$ and $B_z$ represent the cross-axial and axial magnetic field measurements described above, d represents the separation distance between the two wells, θ represents the dip angle between the two wells, and $f_1(\bullet)$ and $f_2(\bullet)$ represent first and second mathematical functions (or empirical correlations) that define $B_y$ and $B_z$ with respect to d and θ. Equation 1 further indicates that $B_y$ is substantially independent of the dip angle θ at small dip angles (e.g., at dip angles less than about 10 degrees).

The mathematical functions/correlations $f_1(\bullet)$ and $f_2(\bullet)$ (in Equations 1 and 2) may be determined using substantially any suitable techniques. For example, cross axial and axial magnetic field measurements may be made at various known orthogonal separation distances d at a number of dip angles θ relative to a string of conventional wellbore tubulars deployed at a surface location. Known interpolation and extrapolation techniques may then be used to determine $B_y$ and $B_z$ at substantially any location relative to the target well (thereby empirically defining $f_1(\bullet)$ and $f_2(\bullet)$. In another example, $f_1(\bullet)$ and $f_2(\bullet)$ may be determined via the use of a theoretical mathematical model (e.g., a finite element model as described above with respect to FIGS. 7-12).

Upon measuring $B_y$ and $B_z$, d and θ may be determined using substantially any suitable techniques. For example, the separation distance d may be computed directly from Equation 1 when the dip angle is small (e.g., in a well twinning application). The computed value may then be substituted into Equation 2 thereby providing for a direction solution for the dip angle θ. Other mathematical techniques for solving Equations 1 and 2 will readily apparent to those of ordinary skill in the art. For example, Equations 1 and 2 may be solved simultaneously using conventional numerical techniques such as mathematical inversion techniques. The disclosed embodiments are not limited to the use of any particular mathematical techniques for solving Equations 1 and 2 as various mathematical techniques will be readily apparent to those of ordinary skill in the art. Moreover, the distance and dip angle may be computed either downhole and/or uphole. For example, in one embodiment $B_y$ and $B_z$ may be transmitted to the surface where d and θ may be computed. In another embodiment, d and θ may be computed downhole (e.g., via the use of a look up table stored in downhole memory) thereby enabling closed loop control of a well twinning operation. The computed d and θ may also be transmitted to the surface to enable surface monitoring and oversight of the operation.

With reference again to FIG. 6, method 500 may be employed dynamically while drilling (e.g., while rotating a drill bit) or statically (e.g., when an additional length of drill pipe is added to the drill string). For example, magnetometer measurements may be made at a rapid time interval while drilling so as to provide substantially real-time dynamic magnetic field measurements. For example, the time interval may be in a range from about 0.0001 to about 0.1 second (i.e., a measurement frequency in a range from about 10 to about 10,000 Hz). In one embodiment a time interval of 10 milliseconds (0.01 second) may be utilized. These measurements may further be averaged (or smoothed) over longer time periods (e.g., 3000 measurements made at a 0.01 second time interval may be averaged over a 30 second time period to obtain an averaged measurement). The static or dynamic measurements may then be used as described above to obtain a distance and/or a dip angle to the target well.

It will be understood that while not shown on FIG. 2, the disclosed magnetic ranging tools generally include at least one electronic controller. Such a controller typically includes signal processing circuitry including a digital processor (a microprocessor), an analog to digital converter, and processor readable memory. The controller typically also includes processor-readable or computer-readable program code embodying logic, including instructions for making magnetic field measurements as described above. The controller may further include instructions for computing the distance and dip angle as is also described above.

A suitable controller typically includes a timer including, for example, an incrementing counter, a decrementing timeout counter, or a real-time clock. The controller may further include multiple data storage devices, various sensors, other controllable components, a power supply, and the like. The controller may also optionally communicate with other instruments in the drill string, such as telemetry systems that communicate with the surface or an EM (electro-magnetic) shorthop that enables the two-way communication across a downhole motor. It will be appreciated that the controller is not necessarily located in the sensor sub (e.g., sub 60), but may be disposed elsewhere in the drill string in electronic communication therewith. Moreover, one skilled in the art will readily recognize that the multiple functions described above may be distributed among a number of electronic devices (controllers).

Although dynamic borehole azimuth measurements and certain advantages thereof have been described in detail, it should be understood that various changes, substitutions and alternations can be made herein without departing from the spirit and scope of the disclosure as defined by the appended claims.

What is claimed is:

1. A downhole magnetic ranging tool comprising:
   a downhole tool body having a through bore and being configured for coupling with a drill string;
   first and second magnetic sources deployed in the downhole tool body, the first and second magnetic sources being spaced apart along an axis of the downhole tool body, the first and second magnetic sources having magnetic moments that opposed one another along the axis; and
   a magnetic field sensor deployed in the downhole tool body, the magnetic field sensor deployed between the first and second magnetic sources.

2. The magnetic ranging tool of claim 1, wherein the downhole tool body is fabricated from a nonmagnetic material.

3. The magnetic ranging tool of claim 1, further comprising a nonmagnetic central housing deployed in the through bore of the downhole tool body, the first and second magnetic sources and the magnetic field sensor being deployed in the central housing.

4. The magnetic ranging tool of claim 1, wherein the first and second magnetic sources are substantially identical to one another.

5. The magnetic ranging tool of claim 1, wherein the first and second magnetic sources comprise first and second permanent rare earth magnets.

6. The magnetic ranging tool of claim 1, wherein the first and second magnetic sources comprise first and second electromagnets or first and second solenoids.

7. The magnetic ranging tool of claim 6, further comprising a controller configured to energize the first and second magnetic sources with an alternating current having a frequency in the range from about 1 to about 10 Hz.

8. The magnetic ranging tool of claim 1, wherein the magnetic field sensor is deployed at midpoint between the first and second magnetic sources.

9. The magnetic ranging tool of claim 1, wherein the magnetic field sensor comprises a cross-axial magnetometer.

10. The magnetic ranging tool of claim 1, where the magnetic field sensor comprises a first cross-axial magnetometer and a second axial magnetometer.

11. The magnetic ranging tool of claim 1, wherein the magnetic field sensor comprises a tri-axial magnetometer set.

12. The magnetic ranging tool of claim 1, comprising a plurality of axial spaced or radially spaced magnetic field sensors deployed between the first and second magnetic sources.

13. A downhole magnetic ranging tool comprising:
   a nonmagnetic downhole tool body having a through bore and being configured for coupling with a drill string;
   first and second substantially identical magnetic sources deployed in the downhole tool body, the first and second magnetic sources being spaced apart along an axis of the downhole tool body, the first and second magnetic sources having magnetic moments that axially opposed one another along the axis, the first and second magnetic sources including first and second electromagnets or first and second solenoids; and
   a magnetic field sensor deployed axially between the first and second magnetic sources in the downhole tool body; and a controller configured to energize the first and second magnetic sources.

14. The magnetic ranging tool of claim 13, further comprising a nonmagnetic central housing deployed in the through bore of the downhole tool body, the first and second magnetic sources and the magnetic field sensor being deployed in the central housing.

15. The magnetic ranging tool of claim 13, wherein the magnetic field sensor is deployed at midpoint between the first and second magnetic sources.

16. The magnetic ranging tool of claim 13, where the magnetic field sensor comprises a first cross-axial magnetometer and a second axial magnetometer.

17. The magnetic ranging tool of claim 13, wherein the controller is configured to energize the first and second magnetic sources with an alternating current having a frequency in a range from about 1 to about 10 Hz.

18. The magnetic ranging tool of claim 13, wherein the controller is further configured to compute a radial separation distance between the magnetic field sensor and a target well.

19. A method for determining a separation distance between a first wellbore and a second cased wellbore, the method comprising:
  (a) deploying a magnetic ranging tool on a drill string in the first wellbore in proximity to the second cased wellbore, the magnetic ranging tool including a magnetic field sensor deployed between first and second magnetic sources in a common downhole tool body, the magnetic sources spaced apart along an axis of the tool body, the first and second magnetic sources having magnetic moments that oppose one another along the axis;
  (b) energizing the magnetic sources;
  (c) measuring a magnetic field with the magnetic field sensor; and
  (d) processing the magnetic field measured in (c) to compute the separation distance.

20. The method of claim 19, wherein the magnetic sources are energized in (b) with an alternating current having a frequency in a range from about 1 to about 10 Hz.

21. The method of claim 19, wherein the separation distance is computed in (d) by processing a cross-axial magnetic field measurement in combination with a model that relates the cross-axial magnetic field measurement to the separation distance.

22. The method of claim 19, further comprising:
  (e) processing the magnetic field measured in (c) compute a dip angle between the first wellbore and the second cased wellbore.

23. The method of claim 22, wherein the dip angle is computed in (e) by processing an axial magnetic field measurement in combination with a model that relates the axial magnetic field measurement with the dip angle.

24. The method of claim 22, wherein the separation distance and the dip angle are computed in (d) and (e) via processing a model that relates the separation distance and the dip angle to the magnetic field measurements, wherein the model is expressed mathematically as follows:

$$B_y = f_1(d,\theta)$$

$$B_z = f_2(d,\theta)$$

wherein $B_y$ and $B_z$ represent cross-axial and axial magnetic field measurements made in (c), d represents the separation distance, θ represents the dip angle, and $f_1(\bullet)$ and $f_2(\bullet)$ represent the model which relates $B_y$ and $B_z$ to d and θ.

* * * * *